United States Patent
Long et al.

(10) Patent No.: US 10,681,076 B1
(45) Date of Patent: *Jun. 9, 2020

(54) AUTOMATED SECURITY ANALYSIS OF SOFTWARE LIBRARIES

(71) Applicant: Wells Fargo Bank, N.A., San Francisco, CA (US)

(72) Inventors: Jeremy W. Long, Herndon, VA (US); Mitch Moon, Plymouth, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 15/951,949

(22) Filed: Apr. 12, 2018

Related U.S. Application Data (63) Continuation of application No. 14/991,256, filed on Jan. 8, 2016, now Pat. No. 10,069,855.

(60) Provisional application No. 62/222,463, filed on Sep. 23, 2015.

(51) Int. Cl.
*H04L 29/06* (2006.01)

(52) U.S. Cl.
CPC .......... *H04L 63/1433* (2013.01); *H04L 63/20* (2013.01)

(58) Field of Classification Search
CPC .... G06F 21/00; G06F 21/128; G06F 11/3604; G06F 11/3692; G06F 11/368; G06F 21/577; G06F 9/455; G06F 9/44; G06F 9/54; G06F 11/36; H04L 9/32; H04L 63/1433; H04L 63/20
See application file for complete search history.

(56) References Cited

U.S. PATENT DOCUMENTS

| | | | |
|---|---|---|---|
| 7,849,509 B2 | 12/2010 | Venkatapathy et al. | |
| 7,937,692 B2 | 5/2011 | Drepper | |
| 8,381,192 B1 * | 2/2013 | Drewry | G06F 11/3624 712/233 |
| 8,561,024 B2 * | 10/2013 | Basler | G06F 8/20 717/124 |
| 8,701,198 B2 * | 4/2014 | Greene | G06F 21/128 717/126 |
| 8,726,254 B2 | 5/2014 | Rohde et al. | |
| 8,844,043 B2 | 9/2014 | Williams et al. | |
| 9,471,285 B1 | 10/2016 | Koohgoli et al. | |
| 9,569,335 B1 * | 2/2017 | Boehm | G06F 11/3604 |
| 2002/0133807 A1 * | 9/2002 | Sluiman | G06F 11/3684 717/124 |
| 2007/0220370 A1 | 9/2007 | Branda et al. | |
| 2009/0282474 A1 | 11/2009 | Chen et al. | |

(Continued)

FOREIGN PATENT DOCUMENTS

EP 2259180 A1 12/2010

*Primary Examiner* — Thanhnga B Truong
(74) *Attorney, Agent, or Firm* — Merchant & Gould P.C.

(57) ABSTRACT

A method for identifying security vulnerabilities in a third party software component includes generating a test application for the third party software component. The test application is generated such that every externally accessible data path in the third party component is called. The test application and the third party software component are analyzed using a static application security testing (SAST) code analyzer. One or more test results are obtained from the SAST code analyzer. The one or more test results are used to identify security vulnerabilities in the third party component.

13 Claims, 8 Drawing Sheets

(56) References Cited

U.S. PATENT DOCUMENTS

| | | |
|---|---|---|
| 2010/0281248 A1 | 11/2010 | Lockhart et al. |
| 2013/0290786 A1 | 10/2013 | Artzi et al. |
| 2014/0173737 A1* | 6/2014 | Toback .................. G06F 21/577 726/25 |
| 2014/0359776 A1 | 12/2014 | Liu |
| 2014/0372985 A1 | 12/2014 | Levin et al. |
| 2015/0237063 A1 | 8/2015 | Cotton et al. |

* cited by examiner

```
                    302
                    FooClass foo = new FooClass();
        308 — if (Math.random()>0.5) {
        304 —    foo.bar();
                 }
        310 — if (Math.random()>0.5) {
        306 —    foo.compute();
                 }
```

```
        package com.sample;

import java.util.logging.Level;
        import java.util.logging.Logger;

402 ─ public class Foo {
           private static final Logger LOGGER = Logger.getLogger(Foo.class.getName());
404 ──   private String data;
406 ──   public String getData() {
              return data;
           }
408 ──   public void setData(String data) {
              this.data = data;
           }
410 ──   public void addPrefix(String prefix) {
              this.data = prefix + data;
              LOGGER.log(Level.FINE, "added prefix: {0}", prefix);
           }
```

```
        package com.sample;

502 ─── public class FuzzFoo {
            public Object RuleGen_AddTaint(Object o) {return o;}
            public float RuleGen_AddTaint(float o) {return o;}
            public double RuleGen_AddTaint(double o) {return o;}
            public byte RuleGen_AddTaint(byte o) {return o;}
504 ───     public short RuleGen_AddTaint(short o) {return o;}
            public int RuleGen_AddTaint(int o) {return o;}
            public char RuleGen_AddTaint(char o) {return o;}
            public long RuleGen_AddTaint(long o) {return o;}
            public boolean RuleGen_AddTaint(boolean o) {return o;}
            public void RuleGen_CheckTaint(Object o) {}

506 ─── public void test1() throws Throwable {
            com.sample.Foo obj = (com.sample.Foo) new Object();
508 ───     if (Math.random()>0.5) {
                obj = new com.sample.Foo();
                RuleGen_CheckTaint(obj);
            }
510 ───     if (Math.random()>0.5) {
                java.lang.String arg0 = (java.lang.String) new Object();
                obj.setData(arg0);
                RuleGen_CheckTaint(obj);
                RuleGen_CheckTaint(arg0);
            }
512 ───     if (Math.random()>0.5) {
                java.lang.String arg0 = (java.lang.String) new Object();
                obj.addPrefix(arg0);
                RuleGen_CheckTaint(obj);
                RuleGen_CheckTaint(arg0);
            }
514 ───     if (Math.random()>0.5) {
                java.lang.String arg0 = (java.lang.String) new Object();
                obj.addPrefix(arg0);
                RuleGen_CheckTaint(obj);
                RuleGen_CheckTaint(arg0);
            }
516 ───     if (Math.random()>0.5) {
                RuleGen_CheckTaint(obj.getData());
                RuleGen_CheckTaint(obj);
            }
```

602 ── public void test2() throws Throwable {
         com.sample.Foo obj = (com.sample.Foo) new Object();
604 ── if (Math.random()>0.5) {
         obj = new com.sample.Foo();
       }
       if (Math.random()>0.5) {
606 ──   java.lang.String arg0 = (java.lang.String) RuleGen_AddTaint(new Object());
         obj.setData(arg0);
         RuleGen_CheckTaint(arg0);
       }
       if (Math.random()>0.5) {
608 ──   java.lang.String arg0 = (java.lang.String) RuleGen_AddTaint(new Object());
         obj.addPrefix(arg0);
         RuleGen_CheckTaint(arg0);
       }
       if (Math.random()>0.5) {
610 ──   java.lang.String arg0 = (java.lang.String) RuleGen_AddTaint(new Object());
         obj.addPrefix(arg0);
         RuleGen_CheckTaint(arg0);
       }
       if (Math.random()>0.5) {
612 ──   RuleGen_CheckTaint(obj.getData());
       }
      }
    }
```

AUTOMATED SECURITY ANALYSIS OF SOFTWARE LIBRARIES

BACKGROUND

Third party software components such as software libraries are commonly used in software applications. The software libraries generally include commonly used methods and functions that may be needed by the software application. When the software application needs to access the methods or functions, the software application can use one or more application program interfaces (APIs) in a software library to call the method or function needed.

Software applications can include security vulnerabilities that make the software applications vulnerable to hackers. Third party software components such as software libraries are also subject to security vulnerabilities. These vulnerabilities can be difficult to identify and assess.

SUMMARY

Embodiments of the disclosure are directed to a method for identifying security vulnerabilities in a third party software component, the method comprising: generating a test application for the third party software component, the test application being generated such that every externally accessible data path in the third party component is called; analyzing the test application and the third party software component using a static application security testing (SAST) code analyzer; obtaining one or more test results from the SAST code analyzer; and using the one or more test results to identify security vulnerabilities in the third party component.

In another aspect, a method for identifying security vulnerabilities in a software library comprises: generating a test application for the software library, the test application being generated such that every externally accessible data path in the software library is called; analyzing the test application and the software library in a static application security testing (SAST) code analyzer, the analyzing of the test application and the software library in the SAST code analyzer comprising identifying a plurality of software entry points in the third party software component; obtaining one or more test results from the SAST code analyzer; using the one or more test results to identify security vulnerabilities in the software library; and using one or more of the test results to generate rules than can be used when testing new applications that use the software library.

In yet another aspect, a method for identifying security vulnerabilities in a software library comprises: generating a test application for the software library; analyzing the test application and the software library in a static application security testing (SAST) code analyzer, the test application using a specific sequence of method calls, the specific sequence comprising, in order: 1) all accessible static methods, 2) all accessible constructors, 3) all singleton style constructors, 4) all accessible setter methods, 5) all accessible methods, 6) all accessible methods called a second consecutive time, 7) all accessible getter methods and 8) all accessible static methods called a second time, the analysis of the test application and the software library by the SAST code analyzer causing all data paths in the software library to be analyzed; obtaining one or more test results from the SAST code analyzer; using the one or more test results to identify security vulnerabilities in the software library; and using one or more of the test results to generate rules than can be used when testing new applications that use the software library.

The details of one or more techniques are set forth in the accompanying drawings and the description below. Other features, objects, and advantages of these techniques will be apparent from the description, drawings, and claims.

DETAILED DESCRIPTION

The present disclosure is directed to testing a third party component such as a software library. A test application is generated that can call all functions (entry points) within the third party component.

The generated application and the third party component are tested with a taint tracking tool, such as a static application security testing (SAST) code analyzer. The test application is able to be compiled with the third party component, but the test application is unable to be successfully executed. Instead, the test application includes methods that cause the SAST code analyzer to taint data passed into the third party component. The test application is generated in such a way that when analyzed with a SAST code analyzer every possible data path through the third party component is analyzed. As discussed in more detail later herein, results of the analysis with the SAST code analyzer can indicate possible security vulnerabilities in the third party component.

Although the analysis can indicate possible security vulnerabilities in the third party component, some of the possible security vulnerabilities can be false positives that are not actually security vulnerabilities. Using the systems and methods, the results are subjected to a manual inspection process, the false positives are rejected and valid test results are produced. As discussed in more detail later herein, the valid results are then used by a rules generator to generate rules that model the third party components behavior and can be used to test other software applications that use the third party component.

As used in this disclosure, tainted data is data that is tracked by the SAST code analyzer and that the SAST code analyzer should not trust. For example, if a software library includes functionality for constructing a SQL database statement but does not include proper validation, filtering and other tests for input data, the SQL statement can be vulnerable to a SQL injection error. The SQL injection error can be created when a user name and password are improperly concatenated into a SQL statement. When tainted data (for example a user name and password) are passed into the library, when the SAST code analyzer detects a SQL injection error in the library, the library can be determined to have a security vulnerability.

The SAST code analyzer analyzes the test application in conjunction with the third party component. In some implementations, during the analysis process source code in the test application and the third party component is converted into an abstract syntax tree. When the abstract syntax tree is created, the SAST code analyzer can perform one or more of data flow analysis, structural analysis and control flow analysis. Other types of analysis are possible.

Use of the systems and methods can create efficiencies in computer systems and improve effectiveness for identifying vulnerabilities in third party components. When SAST code analyzers are used to identify vulnerabilities in the third party components in isolation of a full software application, the SAST code analyzers can have difficulty identifying entry points in the third party components. The entry points are methods and other functions in the third party component that are called by the software application and which can result in a software vulnerability if untrusted data is passed into the entry point. When the third party components are scanned with the full software application, there can be additional problems. The software application often utilizes multiple third party components which can cause problems in terms of an amount of random access memory (RAM) required to perform the scan and that have an effect on a duration of the scan. In addition, if a vulnerability is discovered in a third party component, the vulnerability can be comingled with other vulnerabilities identified in the software application. If an organization is using the third party component in multiple software applications, the identified vulnerability may be identified in the multiple software applications. This can increase review time and make assignment of organizational responsibility challenging.

The systems and methods can reduce computer time and improve efficiencies of computer operations in identifying vulnerabilities in software components by using a specific test application that automatically taints all entry points in the third party components and that generates combinations of methods in the third party components that can be used to identify vulnerabilities. This is done without the need to compile a full, actual software application with the third party component, thereby reducing compilation time and reducing memory requirements. In addition, the scan of the software libraries can be done during an analysis process that is similar to the compilation process and does not require execution of the full software application and the third party component.

Figure 1:
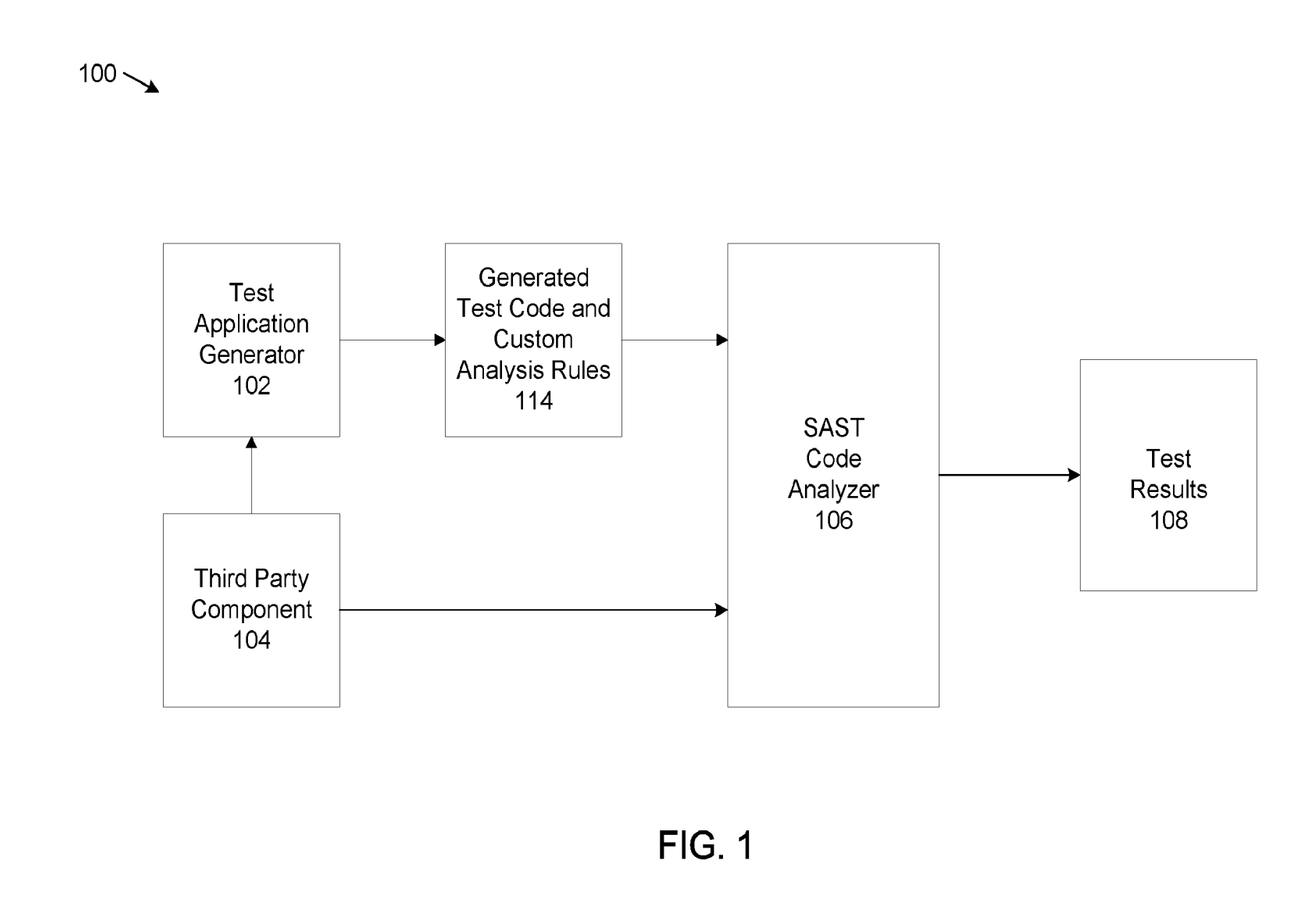
FIG. 1 shows an example system that can be used to support automated security analysis of software libraries.

FIG. 1 shows an example system 100 that can support an enhanced automated security analysis of software libraries. The example system 100 includes a test application generator 102, generated test code and custom analysis rules 114, a third party component 104, a SAST code analyzer 106 and test results 108.

The example test application generator 102 is a software program that generates a compilable, but not executable, test application that calls all methods in a third party component such as a software library. When the generated test application and the third party component are analyzed with the SAST code analyzer 106, potentially vulnerable entry points in the software library can be identified. As discussed in more detail later herein, the analysis includes every possible code path through the software library and permits the insertion of tainted data through a plurality of the code paths.

The example generated test code and custom analysis rules 114 comprise the test application code generated in the test application generator 102 and custom analysis rules. The custom analysis rules allow the SAST Code Analyzer to flag data as tainted and check for tainted data.

The example third party component 104 is a software component obtained from a third party source. The third party component 104 includes functions, methods and other routines that are commonly used by a software application. Examples of the third party component 104 can include software libraries, graphical user interface components and software scripts. Other third party components are possible. In this disclosure, the third party component 104 is assumed to be a software library.

The example SAST code analyzer 106 is an automated testing tool that can provide an analysis of computer software in a software component, such as a software library, without actually executing software code in the software component. The SAST code analyzer 106 can analyze coding and design conditions in the software component that can be indicative of security vulnerabilities. Examples of the SAST code analyzer 106 can include the Hewlett Packard Fortify static code analyzer and the IBM Security App Scan static code analyzer. Other examples are possible.

The example test results 108 are results from using the SAST Code Analyzer 106 to analyze the third party component 104 with the generated test code and custom analysis rules 114. As discussed in more detail later herein, the test results can provide indications of security vulnerabilities in the third party component 104.

As mentioned earlier herein, the test results 108 can include one or more false positives. A false positive is an output result that may seem to indicate a security vulnerability, but upon closer examination can turn out not to indicate the security vulnerability. Because of a possibility of false positives in the test results 108, the systems and methods provide for a manual analysis of the test results 108. The manual analysis can be performed by individuals trained in the use of the SAST code analyzer 106 and trained to detect false positives in the test results 108.

Figure 2:
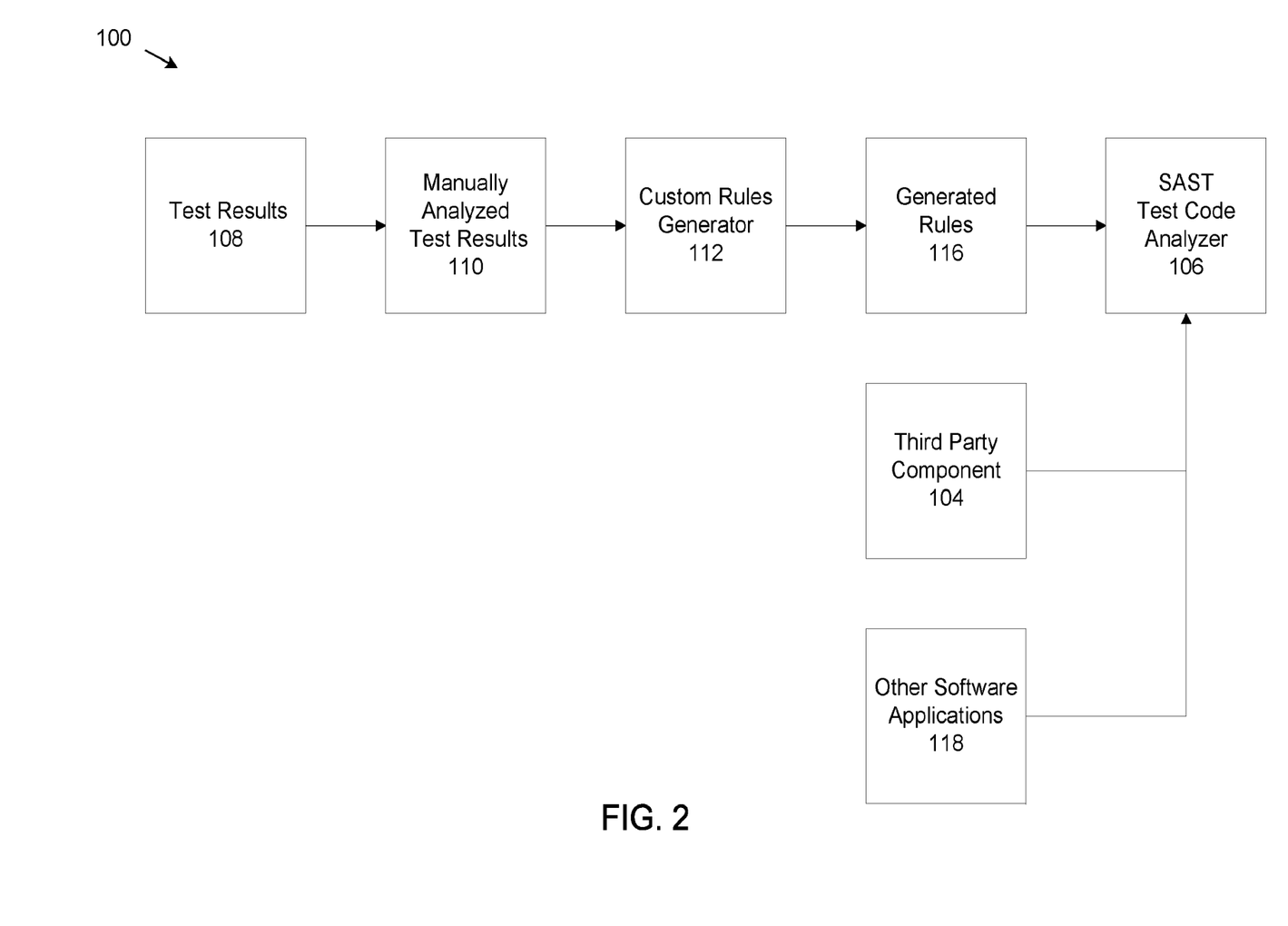
FIG. 2 shows an additional aspect of the system of FIG. 1.

FIG. 2 shows an example diagram showing an additional aspect of system 100. The additional aspect includes feeding manually analyzed test results 110 into an example custom rules generator 112. The manually analyzed test results 110 are obtained from a manual analysis of the test results 108 in which an attempt is made to remove false positives from the test results 108. The custom rules generator 112 can generate rules 116 that can be applied to testing other software applications 118 with the SAST code analyzer 106. The other software applications 118 are those that use the third party component 104 and call methods and functions within the third party component 104. The generated rules 116 allow the SAST code analyzer 106 to identity security vulnerabilities that result from the insecure use of the third party component 104. The manually analyzed test results 110 and the custom rules generator 112 generate rules 116 which are used by the SAST code analyzer 106. The custom rules generator 112 is described in more detail later herein.

Figure 3:
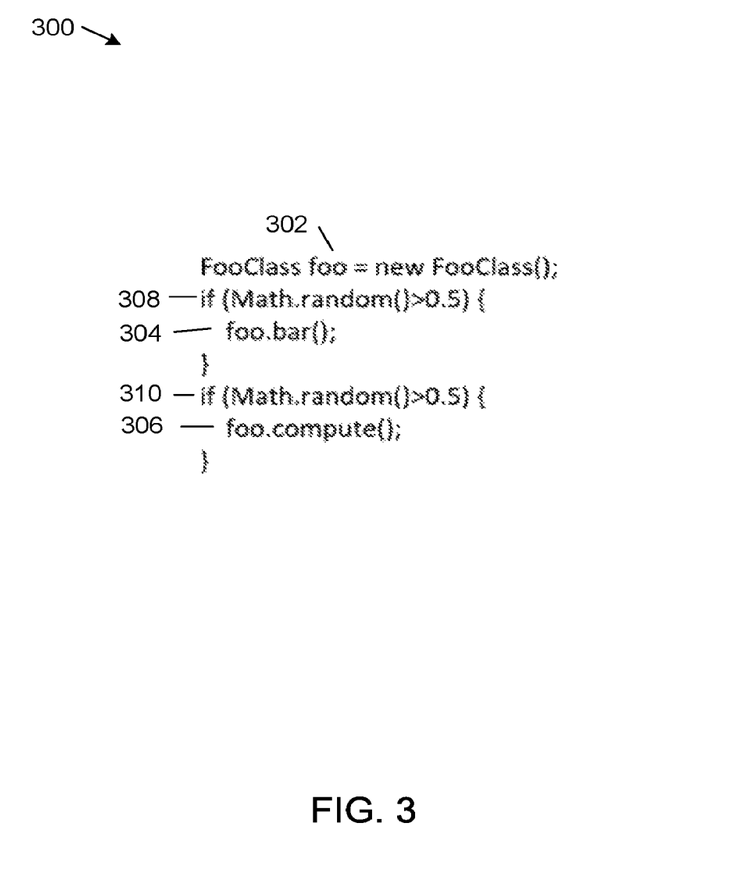
FIG. 3 shows an example software code sample for the test application generator of FIG. 1.

FIG. 3 is an example code sample 300 that illustrates how the test application generator 102 can cause dataflow analysis in the SAST code analyzer 106 to trace every path through a third party component. For example, assume that the third party component 104 includes a class named FooClass that contains methods bar( ) and compute( ). The test application generator 102 can generate code that calls every method in the third party component 104.

As shown in FIG. 3, the example code sample 300 shows an object foo 302 of FooClass being instantiated. The example code sample 300 shows two method calls for the object—one to method foo.bar( ) 304 and the other to method foo.compute( ) 306. The example code sample 300 also includes non-deterministic random function calls 308, 310 that wrap around each of the two method calls 304, 306. The random function calls 308, 310 are non-deterministic because when the example code sample 300 is analyzed by a SAST code analyzer, the SAST code analyzer cannot be certain whether Math.random( ) will have a result greater than 0.5. When the result of random function call 308 is greater than 0.5, foo.bar( ) 304 is analyzed. However, when the result of random function call 308 is less than or equal to 0.5, foo.bar( ) 304 is not analyzed. Similarly, when the result of random function call 310 is greater than 0.5, foo.compute( ) 306 is analyzed and when the result of random function call 310 is less than or equal to 0.5, foo.compute( ) 306 is not analyzed.

Because the SAST code analyzer 106 does not know in advance what the value of Math.random( ) will be, the SAST code analyzer 106 includes all possible execution paths in the analysis. Therefore, the SAST code analyzer 106 needs to consider four paths: 1) FooClass being instantiated followed by calls to foo.bar( ) 304 and to foo.compute( ) 306, 2) FooClass being instantiated followed by a call for foo.bar( ) 304, 3) FooClass being instantiated followed by a call to foo.compute( ) 306 and 4) FooClass being instantiated with no methods called.

Using the systems and methods, the test application generator 102 can provide test application code that is automatically generated. In general, the test application generator 102 can automatically generate the test application code using sequences of 1) calling each method or function in the third party component and passing the results of each call to the third party component into a taint checking method and 2) by performing the exact steps in 1) and adding a data tainting method call to all data passed into the third party component. The first sequence allows the SAST code analyzer to determine if tainted data is generated by the third party component; whereas the second sequence allows the SAST code analyzer to identify security vulnerabilities within the third party component. Additionally, the second sequence allows the custom rules generator to better model the behavior of the third party component by being able to identify if method or function in the third party component should be considered a pass through (i.e. tainted data passed into an argument to the method or function is then returned by the method or function).

The tainted data and the checks for tainted data are added to the generated test application code using special function calls that are recognized by the custom analysis rules. In an example implementation, as discussed in more detail later herein, tainted data is added to the test application code by using a RuleGen_AddTaint( ) method. A rule for adding tainted data using the RuleGen_AddTaint( ) method is considered a source rule. In the example implementation, as also discussed in more detail later herein, a check for tainted data is added to the test application code by using a RuleGen_CheckTaint( ) method. A rule for adding a check for tainted data using the RuleGen_CheckTaint( ) method is considered a sink rule.

Other rules for automatically generating test application code are possible. For example, rules can check for resource linkage issues in the third party component (e.g. when an object that must be explicitly closed goes out of scope prior to being closed).

The automatic generation is such that every accessible method in the third party component is called. As used in this disclosure, the term "accessible" includes all public methods and constructors, all protected methods and constructors of non-final classes. The systems and methods provide for testing the accessible methods in a specific order. In an example implementation, the order of the accessible methods in the test application code is: 1) all accessible static methods, 2) all accessible constructors, 3) all singleton style constructors (i.e. methods are static and return a class in which they are defined), 4) all accessible setter methods (i.e. setXyz(Object)), 5) all accessible methods, 6) all accessible methods (called a second consecutive time), 7) all accessible getter methods (i.e. Object get Xyz( ), 8) all accessible static methods (called for a second time).

As noted from the above sequence, some of the methods are called multiple times. This is to ensure that all possible code paths are considered. If calling methodB( ) alters an internal state of an object, it is possible that when methodA( ) is subsequently called a vulnerability can occur. To test for the possibility of such a vulnerability, methodB( ) needs to be called before methodA( ). To ensure that methodB( ) is called before methodA( ), all accessible methods are processed twice in the specific order described above.

Figure 4:
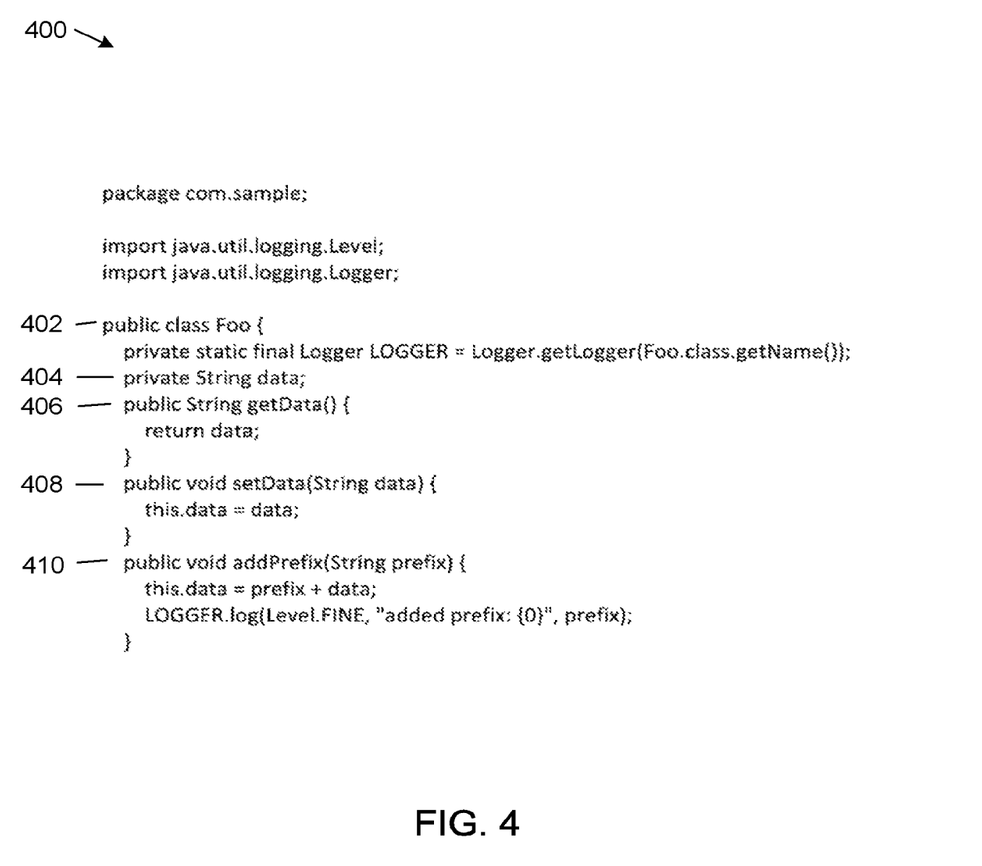
FIG. 4 shows another example software code sample for the test application generator of FIG. 1.

FIG. 4 shows an example code sample 400 of a third party component. The code sample for the third party component 400 includes a public class Foo 402. The public class Foo 402 includes private string data 404, a public method getData( ) 406 that returns a string, a public method setData (String data) 408 and a public method addPrefix(String prefix) 410. The public class Foo 402, private string data 404, public method getData( ) 406, public method setData (String data) 408 and public method addPrefix(String prefix) 410 are used in example code sample 500 of FIG. 5 and example code sample 600 of FIG. 6, as described below herein.

Figure 5:
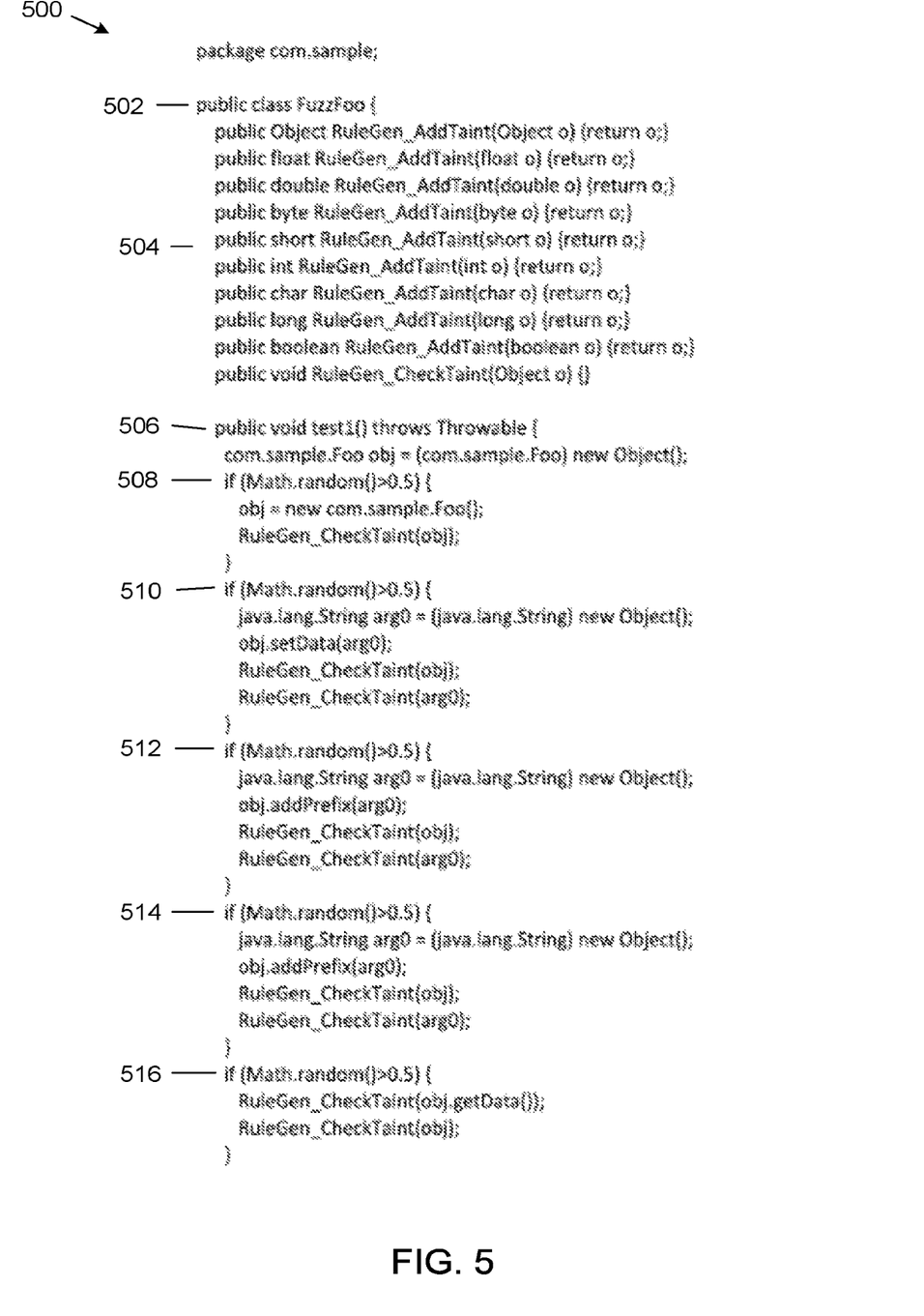
FIG. 5 shows yet another example software code sample for the test application generator of FIG. 1.

FIG. 5 shows an example generated code sample 500 generated by the test application code generator. The code sample 500 includes a public class FuzzFoo 502 which includes a public method test1( ) 504. The FuzzFoo 502 class includes definitions 504 for a RuleGen_AddTaint( ) method call and for a RuleGen_CheckTaint( ) method call. The example RuleGen_AddTaint( ) method call includes definitions for data types of object, float, double, byte, short, int, char, long and boolean. The RuleGen_CheckTaint( ) method call takes an object as a parameter.

The FuzzFoo 502 class includes a public method test1( ) 506. The test1( ) 506 method first instantiates a global object of class Foo. The test1( ) 506 method also includes example code segments 508, 510, 512, 514 and 516. Each of the example code segments is wrapped around a random( ) function call, which as explained earlier herein, ensures that all paths within the code segment are analyzed.

For the first example code segment 508, an object (obj) is instantiated and cast to class Foo. Then, two paths are analyzed. For one path, the object is checked via RuleGen_CheckTaint(obj) to determine whether the instantiation of the object produced tainted data. For the second path (i.e. for the case where Math.random( )<=0.5, the object of class Foo is not instantiated and the RuleGen_CheckTaint (obj) method is not called.

For the second example code segment 510, when Math.random( )>0.5, a string argument (arg0) is instantiated, data is set into the string argument and checks for tainted data are made for both the object obj and string arg0. When Math.random( )<=0.5, code segment 510 is not analyzed.

For the third example code segment 512, when Math.random( )>0.5, a string argument (arg0) is instantiated, a prefix is added to the string argument and checks for tainted data are made for both the object obj and string arg0. When Math.random( )<=0.5, code segment 512 is not analyzed.

For the fourth example code segment 514, when Math.random( )>0.5, the same code statements as for segment 512 are analyzed again. This is to check whether any additional vulnerabilities were caused by memory changes when code segment 512 was analyzed. When Math.random( )<=0.5, code segment 514 is not analyzed.

For the fifth example code segment 516, when Math.random( )>0.5, a check for tainted data is made first on the object obj after a getData( ) method call is implemented using the object. Following the first check, a second check for tainted data is made on the object obj. When Math.random( )>=0.5, code segment 516 is not analyzed.

Figure 6:
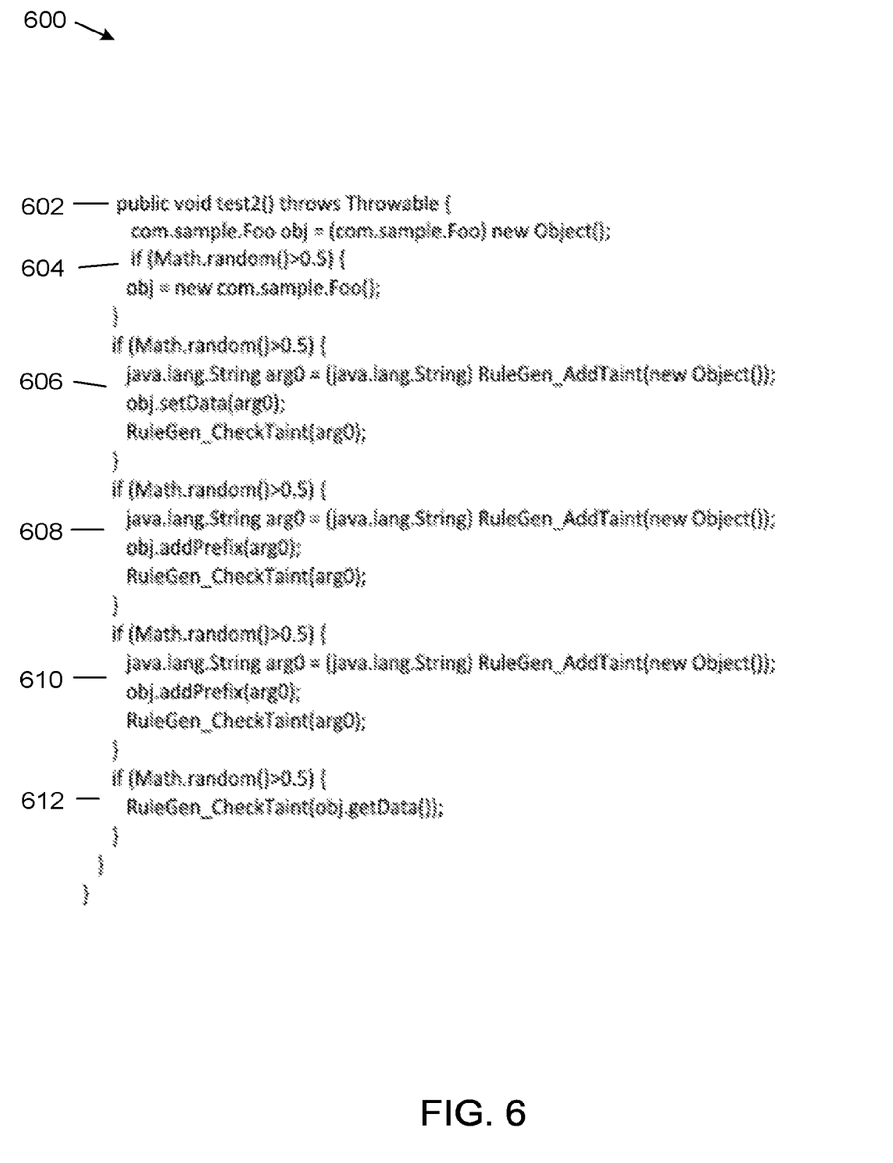
FIG. 6 shows yet another example software code sample for the test application generator of FIG. 1.

FIG. 6 shows an example code sample 600 of a second public method test2( ) 602 for FuzzFoo class. The test2( ) 602 method is similar to the test1( ) 506 method except that the test2( ) 602 method adds tainted data (via RuleGen_AddTaint( ) before checking for tainted data.

The test2( ) 602 method first instantiates a global object of class Foo. The test2( ) 602 method also includes example code segments 604, 606, 608, 610 and 612. Each of the example code segments is wrapped around a random( ) function call.

For the first example code segment 604, when Math.random( )>0.5 an object (obj) is instantiated and cast to class Foo. When Math.random( )<=0.5, code segment 604 is not analyzed.

For the second example code segment 606, when Math.random( )>0.5, when a string argument (arg0) is instantiated, tainted data added to the string argument arg0 (via RuleGen_AddTaint(new Object)). The tainted data is then set into the string argument (via obj.setData(arg0)) and checks for tainted data are made for the string arg0 (via RuleGen_CheckTaint(arg0). When Math.random( )<=0.5, code segment 606 is not analyzed.

For the third example code segment 608, when Math.random( )>0.5, a string argument (arg0) is instantiated with tainted data, a prefix is added to the string argument and checks for tainted data are made for the string arg0. When Math.random( )<=0.5, code segment 608 is not analyzed.

For the fourth example code segment 610, when Math.random( )>0.5, the same code statements as for segment 608 are analyzed again. This is to check whether any additional vulnerabilities were caused by memory changes when code segment 608 was analyzed. When Math.random( )>=0.5, code segment 610 is not analyzed.

For the fifth example code segment 612, when Math.random( )>0.5, a check for tainted data is made first on the object obj after a getData( ) method call is implemented using the object. When Math.random( )<=0.5, code segment 612 is not analyzed.

After the test application generator 102 generates the test application and the test application is analyzed with the third party component 104, for example by analyzing the code segments of FIGS. 4-6, the test results 108 from the analysis are manually examined to look for false positives in the test results 108. After the test results 108 are manually examined, processed test results 202 are used by the custom rules generator 112 to generate rules 116 that can model a behavior of the third party component. The custom rules can be applied to the SAST code analyzer 106 to permit the SAST code analyzer 106 to check for security vulnerabilities in other software applications 118 that use the third party component.

Some example types of custom rules that are generated can include a data flow source rule, a data flow pass through rule and a data flow sink rule. Other types of custom rules are possible.

The example data flow source rule can be used to model behavior of the third party component such that when a method is called, a source of tainted data is identified. The source of tainted data is identified when no specific tainted data is passed into a class and when the SAST code analyzer 106 identifies tainted data upon a call to RuleGen_CheckTaint( ).

The example data flow pass through rule can be used to model the behavior of the third party component when tainted data enters the third party component and is passed to a return value or as an output of an argument of a method or leaves the third party component when a different method is called. A data flow pass through is identified when the test application generator 102 adds tainted data (e.g. via is passed into a RuleGen_AddTaint( ) call) and is then returned to a different argument and passed to a return value or an object (e.g. via a call to RuleGen_CheckTaint( ).

The example data flow sink rule can be used to model behavior of the third party component such that when tainted data enters the third party component and causes a vulnerability. The vulnerability is identified when tainted data is passed into the third party component via a method call in the test application generator 102 and results in a vulnerability in the third party component.

Figure 7:
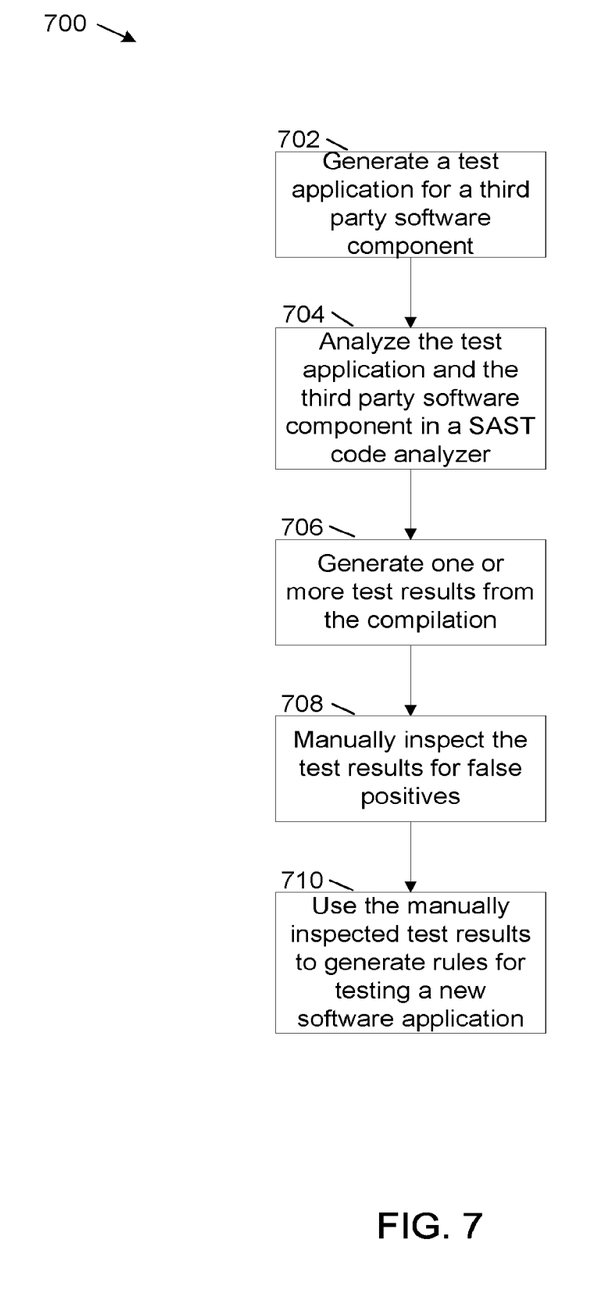
FIG. 7 shows a flowchart of an example method for testing for software vulnerabilities in the third party component of FIG. 1.

FIG. 7 shows a flowchart for an example method 700 for testing for software vulnerabilities in third party components such as software libraries. The method 700 tests the third party component using a SAST code analyzer in isolation of a full application using test code from test application generator 102.

At operation 702, a test application is generated for a third party component. The text application is automatically generated, for example by test application generator 102, by identifying all APIs in the third party component and then using rules to generate software code that can call all paths in the third party component. The third party component is typically a software library, although other types of components, for example graphical user interface components, can be used.

At operation 704, the test application and the third party component are analyzed using a SAST code analyzer, for example in SAST code analyzer 106. The SAST code analyzer permits a security analysis of the third party component as a result of the analysis process. The test application code that calls the third party component is compilable but not executable. The SAST code analyzer 106 includes rules to specify how to process the RuleGen_AddTaint( ) and RuleGen_CheckTaint( ) methods.

At operation 706, one or more test results are generated as a result of the analysis. The test results can indicate potential security vulnerabilities in the third party component.

At operation 708, the test results are processed by manually examining the test results for false positives. The SAST code analyzer can identify potential security vulnerabilities, which upon closer inspection are not really security vulnerabilities. As used in this disclosure, a potential security vulnerability that upon inspection is not determined to be a security vulnerability is designated as a false positive. When false positives are found, the test results are modified to eliminate the false positives.

At operation 710, the modified manually inspected test results are used to generate rules for testing a new software application. For example, if the SAST code analyzer identifies a vulnerability in a method where a prefix with tainted data is added to a string, a rule can be created to flag an error whenever tainted data is added to addPrefix( ) in the new software application.

Figure 8:
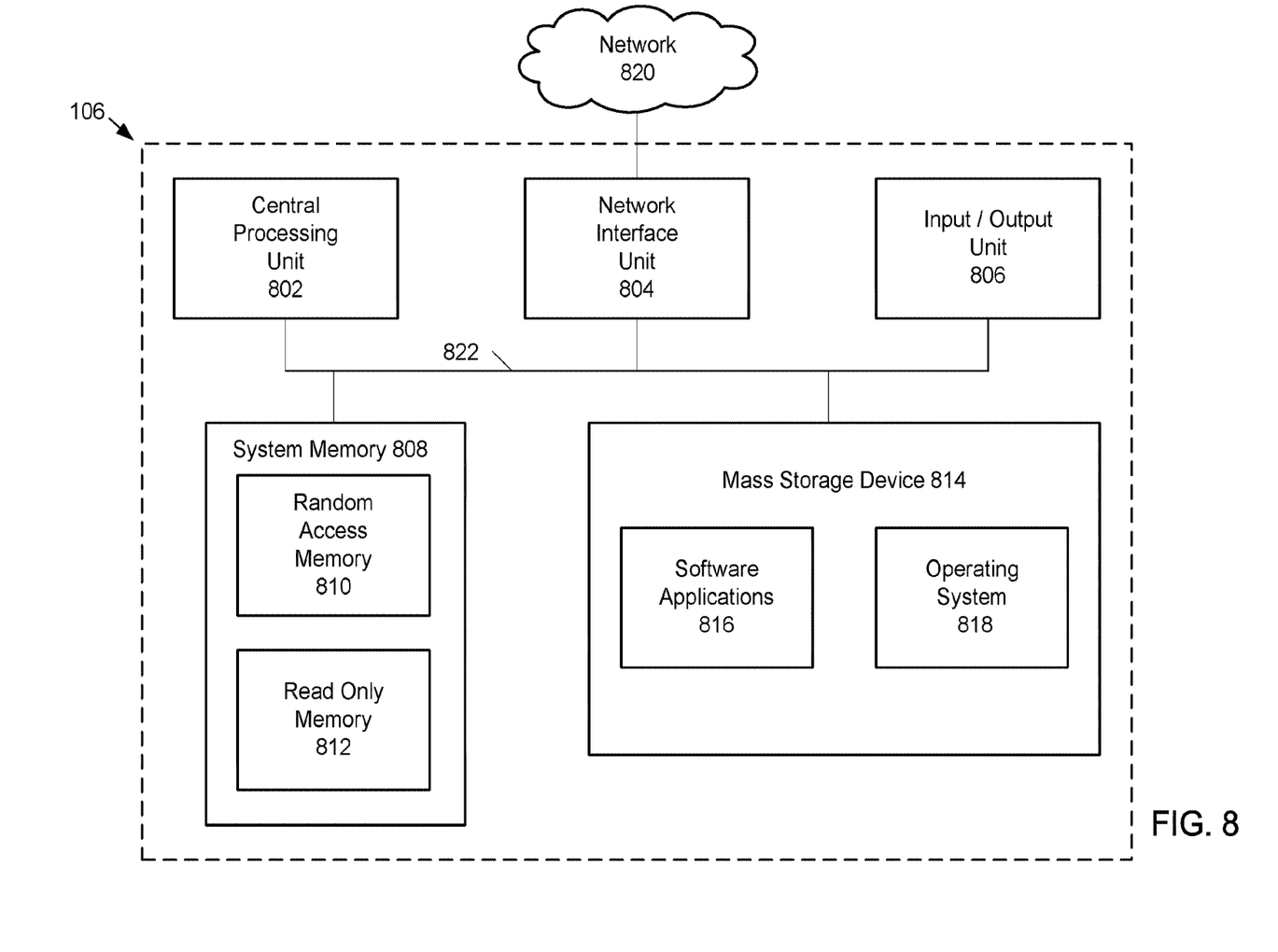
FIG. 8 shows example physical components of a SAST code analyzer of FIG. 1.

As illustrated in the example of FIG. 8, SAST code analyzer 106 includes at least one central processing unit ("CPU") 802, a system memory 808, and a system bus 822 that couples the system memory 808 to the CPU 802. The system memory 808 includes a random access memory ("RAM") 810 and a read-only memory ("ROM") 812. A basic input/output system that contains the basic routines that help to transfer information between elements within the SAST code analyzer 106, such as during startup, is stored in the ROM 812. The SAST code analyzer 106 further includes a mass storage device 814. The mass storage device 814 is able to store software instructions and data. Some or all of the components of the SAST code analyzer 106 can also be included in test application generator 102 and the third party component 104.

The mass storage device 814 is connected to the CPU 802 through a mass storage controller (not shown) connected to the system bus 822. The mass storage device 814 and its associated computer-readable data storage media provide non-volatile, non-transitory storage for the SAST code analyzer 106. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the SAST code analyzer 106.

According to various embodiments of the invention, the SAST code analyzer 106 may operate in a networked environment using logical connections to remote network devices through the network 820, such as a wireless network, the Internet, or another type of network. The SAST code analyzer 106 may connect to the network 820 through a network interface unit 904 connected to the system bus 822. It should be appreciated that the network interface unit 804 may also be utilized to connect to other types of networks and remote computing systems. The SAST code analyzer 106 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the SAST code analyzer 106 can store software instructions and data. The software instructions include an operating system 818 suitable for controlling the operation of the SAST code analyzer 106. The mass storage device 814 and/or the RAM 810 also store software instructions, that when executed by the CPU 802, cause the SAST code analyzer 106 to provide the functionality of the SAST code analyzer 106 discussed in this document. For example, the mass storage device 814 and/or the RAM 810 can store software instructions that, when executed by the CPU 802, cause the SAST code analyzer 106 to display received data on the display screen of the SAST code analyzer 106.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for identifying security vulnerabilities in a third party software component, the method comprising:
   identifying procedures used in the third party software component;
   implementing a procedure call for each identified procedure, respectively, in the third party software component;
   obtaining a result of each procedure call;
   passing the result of each procedure call to a taint checking method; and
   using the taint checking method to determine whether the result of each procedure call includes tainted data.

2. The method of claim 1, further comprising:
   analyzing the result of each procedure call with a static application security testing (SAST) code analyzer; and
   using the SAST code analyzer to determine whether tainted data is generated by the third party software component.

3. The method of claim 1, further comprising:
   generating test data;
   passing the test data into the third party software component;
   implementing each identified procedure call using the test data;
   obtaining a result of each procedure call using the test data;
   passing the result of each procedure call using the test data to the taint checking method; and
   using the taint checking method to determine whether the result of each procedure call using the test data includes tainted data.

4. The method of claim 3, further comprising:
   analyzing the result of each procedure call using the test data with a static application security testing (SAST) code analyzer; and
   using the SAST code analyzer to determine whether tainted data is generated by the third party software component as a result of using the test data.

5. The method of claim 1, further comprising testing every externally accessible data path in the third party component.

6. The method of claim 1, wherein at least one procedure call is a non-deterministic procedure call.

7. The method of claim 1, further comprising adding tainted data to the taint checking method.

8. The method of claim 7, wherein the tainted data is added by using a specific method call that adds the tainted data.

9. The method of claim 1, wherein each procedure used in the third party software component includes all public methods and constructors and all protected methods and constructors of non-final classes.

10. The method of claim 9, wherein all public methods and constructors includes all accessible static methods, all accessible constructors, all singleton style constructors, all accessible setter methods and all accessible getter methods.

11. The method of claim 1, wherein at least one procedure used in the third party software component is called more than once.

12. The method of claim 1, further comprising using a test application to implement each procedure call.

13. The method of claim 12, further comprising compiling the test application with the third party software component.

* * * * *

UNITED STATES PATENT AND TRADEMARK OFFICE
CERTIFICATE OF CORRECTION

PATENT NO. : 10,681,076 B1
APPLICATION NO. : 15/951949
DATED : June 9, 2020
INVENTOR(S) : Long et al.

Page 1 of 1

It is certified that error appears in the above-identified patent and that said Letters Patent is hereby corrected as shown below:

In the Specification

Column 7, Line 18: Delete ">=0.5," and insert --<=0.5,--

Column 7, Lines 22-23: Delete "RuleGen_AddTaint( )" and insert --RuleGen_AddTaint( ))--

Column 7, Line 52: Delete ">=0.5," and insert --<=0.5,--

Column 8, Line 24, Delete "RuleGen_CheckTaint( )" and insert --RuleGen_CheckTaint( ))--

Signed and Sealed this
Eighth Day of December, 2020

Andrei Iancu
*Director of the United States Patent and Trademark Office*